Patented Feb. 9, 1926.

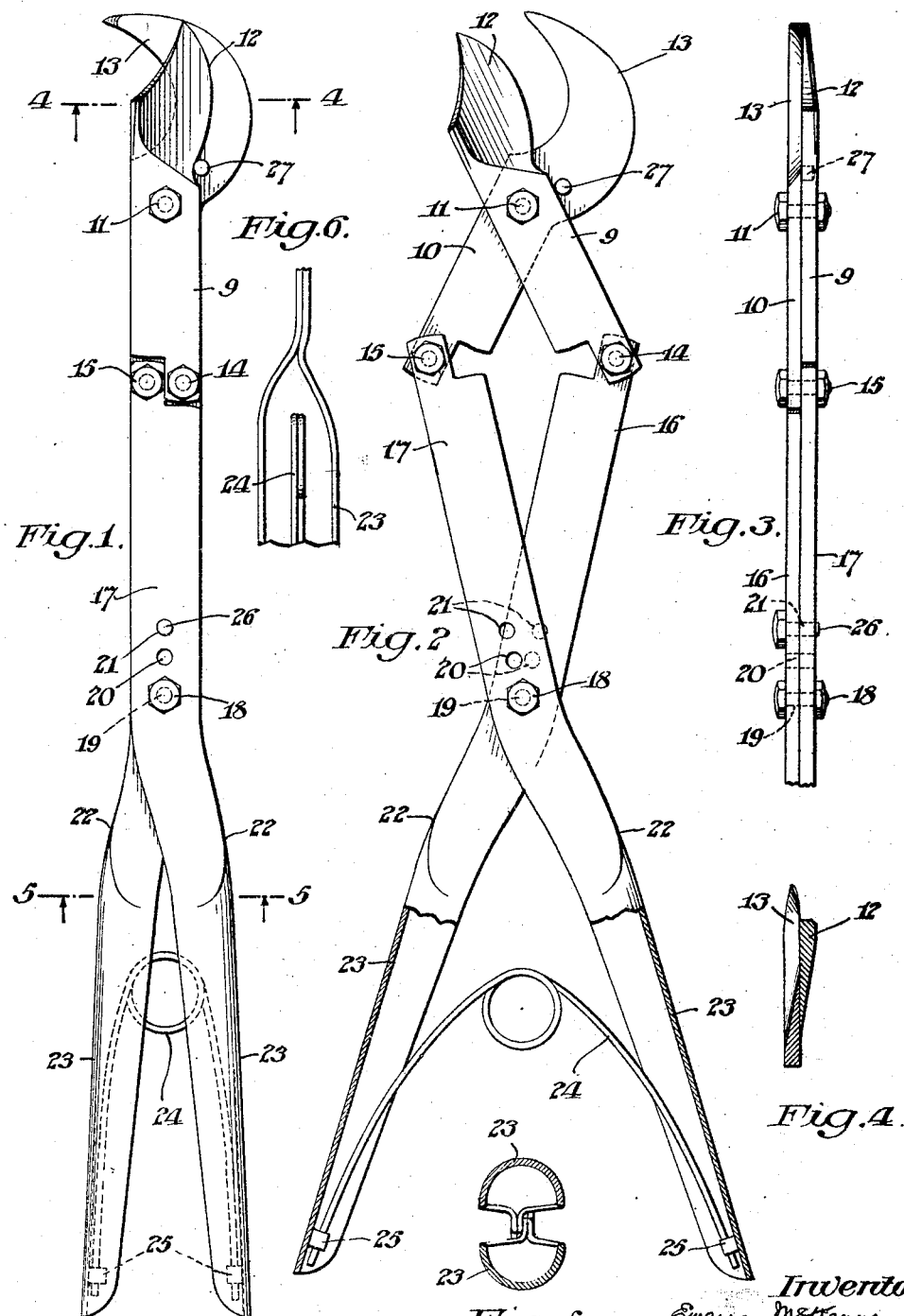

1,572,546

UNITED STATES PATENT OFFICE.

EMERSON McKENNEY, OF NEWPORT, MAINE.

PRUNER.

Application filed May 28, 1923. Serial No. 641,817.

*To all whom it may concern:*

Be it known that I, EMERSON McKENNEY, a citizen of the United States, residing at Newport, in the county of Penobscot, State of Maine, have invented a new and useful Pruner, of which the following is a specification.

The invention relates to improvements in pruners. The object is to provide an improved pruning device which shall be simple and substantial in construction, convenient, and efficient in operation, adjustable for varying grades of work; the elements readily replaceable and adapted to be locked in closed-position when not in use.

The following are among the advantages combined in the device made in accordance with the invention;—

The blades are so formed as to force the limb down into the throat of the concave blade giving a spiral cut.

The blades overlap throughout the extent of their cutting edges, and in approximately the same plane, thereby preventing crossing.

The blades are so formed, related and cooperated as to have a shearing effect.

Both blades are ground into cutting form to make a smooth clean cut.

The pruner is so formed and arranged as to enable pruning in confined spaces.

The fulcrum point of the power levers has improved means of adjustment for different grades of work.

The operating handles have a relatively limited range of movement, for convenience of operation, especially for women's use.

The hand operated lever of one blade member lies in the plane of the other blade member, thereby making an unusually compact instrument.

The limit of opening movement is provided by a stop on one of the blades.

A spring is provided in the recessed portions of the handles, automatically to open the blades to the limit provided by the stop.

The hollow handles provide a housing for the spring, substantially enclosing the spring when the instrument is closed.

Simple and convenient means are provided for locking the instrument in closed position, comprising a pin for engagement in one pair of holes which are not utilized for the fulcrum.

Maximum of leverage is secured for the range of movement of the handles.

Referring to the drawings, which illustrate merely by way of example, a suitable embodiment of the invention—

Fig. 1 is a side elevation in closed position.

Fig. 2 is a similar view in open position.

Fig. 3 is a fragmentary edge elevation from the cutting blades to the fulcrum.

Fig. 4 is a section on line 4, 4 of Fig. 1.

Fig. 5 is a section on line 5,5 of Fig. 1.

Fig. 6 is a fragmentary plan of the inner side of a handle member.

Similar numerals refer to similar parts throughout the several views.

The blade members 9 and 10 are pivoted at 11. Member 9 is provided with the convex blade 12 having a nicely ground bevel throughout its cutting range and extending back to approximate the rear margin thereof. Member 10 is provided with the concave blade 13 also ground with a bevel throughout its cutting range, said level extending back to approximately the rear margin thereof. The opposite ends of members 9 and 10 are pivotally connected, as at 14 and 15, to the ends of the hand operated levers 16 and 17. These hand levers 16 and 17 are pivotally connected together by a suitable bolt or pin, as at 18, in any of the three pairs of holes 19, 20 or 21.

The hand levers 16 and 17 are made of sheet metal doubled and pressed together into a compact bar from their upper ends, to a point as at 22, below the pivot 18. The parts below point 22, forming the hand grips 23 are bent into concavo-convex cross-section, of semi-cylindrical shape, thereby forming effective handles and, at the same time, ample housing for a spring.

The spring 24 is secured to the pins or posts 25, in the hollow portions near the ends of the handle portions 23. A pin 26 is provided to engage a pair of holes 19, 20 or 21, not used by the pivot 18, to lock the device in the closed position. The pin 27 is secured in blade 13 as a stop for engaging the member 9, to limit the opening movement of the device.

The members 9 and 10 and the hand levers 16 and 17 are so recessed at their ends engaged by pivots 14 and 15, that the projecting portion of one lever, say 16, will be received in the recessed part of a blade member as 10. So that all the adjacent elements will fit together as shown in Figs. 1 and 3, hand lever 17 lying flush with member 9, and hand lever 16 lying flush with member 10.

What I claim is:—

1. In a pruner, the combination of a pair of cutting blade members fulcrumed between their two ends, and a pair of hand operating levers, each having an end pivoted to the end of a blade member, said hand levers each provided with a plurality of fulcrum holes for adjusting the fulcrum of said hand levers, the arrangement being such that the fulcrum of the hand levers is always a greater distance than the fulcrum of the blade members, from their said end connections, and so that the extensions between said fulcrums will overlap in perfect alinement when the pruner is closed.

2. In a pruner, the combination of a pair of cutting blade members pivoted together between their two ends, and a pair of hand operating levers pivoted together between their two ends, one end of each hand lever pivoted to an end of a blade member, said ends all being recessed so the recessed end of each hand lever will receive the end of a blade member to which it is not attached, when the device is closed.

3. In a pruner, the combination of a pair of cutting blade members pivoted together between their two ends, and a pair of hand operating levers formed of sheet metal bent into semi-circular cross-section to form hand grips, the balance of said levers pressed together into integral laminated bars, said bars pivoted together intermediate their two ends and the free ends thereof pivotally connected to the ends of the cutting blade members.

EMERSON McKENNEY.